United States Patent

Jokela et al.

[11] Patent Number: 6,089,971
[45] Date of Patent: Jul. 18, 2000

[54] WINDSHIELD AIR DEFLECTOR

[76] Inventors: George A. Jokela; George A. Jokela, Jr.; William A. Jokela, all of 252 Hamilton Ave., Panama City, Fla. 32401

[21] Appl. No.: 09/200,804

[22] Filed: Nov. 27, 1998

[51] Int. Cl.[7] .......................................................... B60S 1/54
[52] U.S. Cl. ................................................................. 454/127
[58] Field of Search ............................... 454/85, 93, 127, 454/198

[56] References Cited

U.S. PATENT DOCUMENTS

| | | | |
|---|---|---|---|
| 1,073,091 | 9/1913 | Carence | 454/85 |
| 2,192,657 | 3/1940 | Werther | 454/127 |
| 2,779,067 | 1/1957 | Stanley | 454/127 |
| 4,105,246 | 8/1978 | Trumbull | 454/127 X |
| 4,109,562 | 8/1978 | MacDonald | 454/127 X |

Primary Examiner—Harold Joyce
Attorney, Agent, or Firm—William B. Noll

[57] ABSTRACT

The combination of an automotive air defroster system and windshield air deflector. The system includes, in part, a vent or vents in close proximity to the inside surface of the windshield. The air deflector, particularly usefull in very cold and icy weather, includes an elongated, heat resistant, planar member hingedly secured to at least a pair of legs. The legs are secured to the upper dashboard, adjacent the vent or vents, and the planar member is pivoted upward to direct hot air from the vent(s) against the windshield to facilitate melting of any accumulated ice, on the exterior of the windshield.

2 Claims, 1 Drawing Sheet

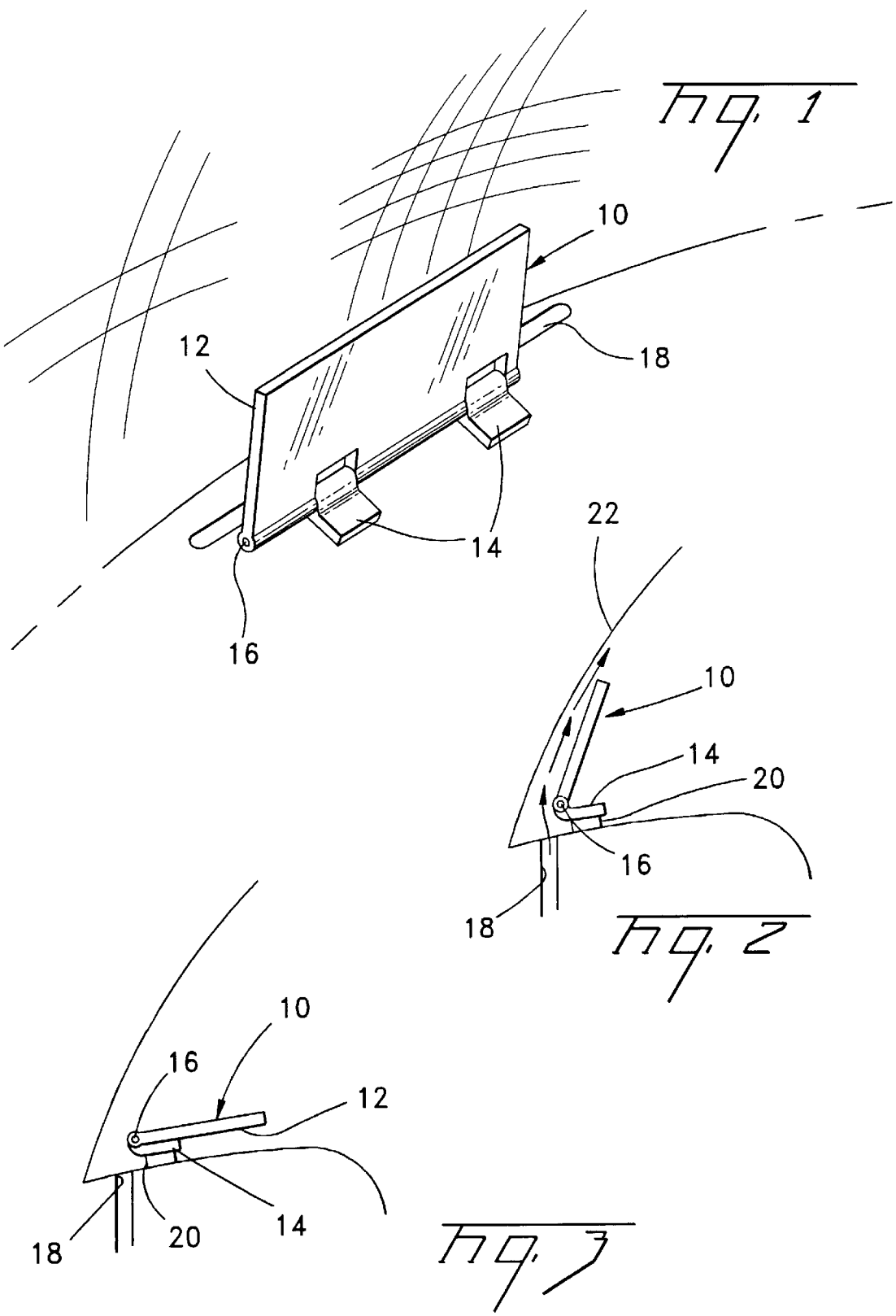

WINDSHIELD AIR DEFLECTOR

FIELD OF THE INVENTION

This invention is directed to the field of windshield defogger devices for mounting to the upper dash-board of an automobile adjacent to the windshield vents to direct heated air from the vents toward the windshield.

BACKGROUND OF THE INVENTION

The present invention relates to an automotive aid in the form of a device to concentrate and direct heated air, from the engine through the windshield defroster vents, against the windshield. In winter, particularly in the northern states of the U.S., drivers frequently experience the accumulation of ice and snow on the exposed windshield of the driver's automobile. Typically, the only implement available to the driver is a scraping device, which is helpful to removing loose snow.

However, a layer of fresh ice, underlying the snow, is difficult to remove with the scraping device. While attempting to remove the ice, the driver starts the engine and turns on the defroster to initiate melting of the ice. Unfortunately, the hot air exiting the defroster vents often pass directly into the automobile's interior with only a portion thereof directed toward the windshield. As a consequence, a lot of wasted time is spent waiting for the ice to melt. There appears to be no commercial devices available to assist such drivers.

This nearest prior art is reflected in the following U.S. Patents:

a.) U.S. Pat. No. 4,583,448, to Sasakii, et al. relates to a windshield defroster including a defroster outlet positioned within the dashboard of a vehicle, in which a cover plate is attached within the defroster outlet. The cover plate includes an opening and a plurality of bars which separate the opening into various sections, so that the bars within the cover plate prevent objects from dropping into the defroster outlet. The windshield defroster includes a duct attached to the bottom surface of the dashboard, and a heater is positioned within the duct, so that warm air can be distributed to the defroster outlet through the opening in the cover plate. The cover plate is swingably connected to the duct by a hinge, and the hinge is integrally formed with the duct and the cover plate. The cover plate has a lower surface in the vicinity of the hinge, and the duct has a horizontal first projection in the vicinity of the hinge. The lower surface of the cover plate is in contact with the horizontal first projection of the duct, and the cover plate is thereby horizontally supported without any additional support for the free end of the cover plate.

b.) U.S. Pat. No. 4,602,556, to Gladden, teaches an air deflector for use with an air exhaust grill to deflect the air being discharged therethrough. The deflector includes an elongated plate member having first and second ends and a tab member attached to the first end of the plate member and clamped between the air exhaust grill and the supporting surface to position the plate member so as to deflect the air being exhausted through the air exhaust grill toward the second end of the plate member.

c.) U.S. Pat. No. 4,637,298, to Yoshikawa, et al., is directed to a windshield defroster assembly for a vehicle dash-board including a defroster outlet having a plate attached therein to control the direction of flow of the heated air. The plate is slanted to direct the flow of the heated air. The bottom edge of the plate remains underneath the bottom surface of the dashboard. Heated air hits the rear surface of the plate, and the blowing direction of the heated air follows along the rear surface of the plate. When the heated air is discharged from the defroster outlet, the heated air is concentrated on an area of the windshield thereby removing frost and moisture from the entire surface of the windshield. A top edge of the plate is disposed at most only slightly over a top surface of the dashboard, so that the plate does not prevent the driver from seeing outside of the vehicle through the windshield.

None of the above prior art offers a simple, yet effective means to direct hot air toward the interior surface of the windshield. The manner by which this is accomplished will become more apparent in the description to follow, particularly when read in conjunction with the accompanying drawings.

SUMMARY OF THE INVENTION

The invention relates to an air deflector device for use in conjunction with an automobile's defroster system, which in part includes one or more vents or ports through which warm air passes to help melt any ice that may have accumulated on the windshield. The air deflector device comprises an elongated planar member that is heat resistant, such as plastic. The planar member may be transparent, tinted, translucent or opaque. The planar member is further hingedly attached to a pair of legs which are adapted to be secured to the upper dashboard adjacent the vents or ports. The device can be removably attached to the dashboard by double-sided tape, or by hook and pile fastening strips, where a commercial product of the latter is VELCRO, a trademark In any case, in the operable mode the planar member is pivoted forward toward the windshield to direct and concentrate the air coming from the vents or ports toward the windshield when not in use, the planar member is pivoted back to essentially lie against the dashboard.

Accordingly, an object of this invention is to provide a driver, particularly one living in cold climates, with a simple automotive aid in the form of an air deflector device to help in melting ice on the windshield.

Another object hereof is the provision of a low cost device that may be permanently fixed to a car's upper dashboard, or removably secured if switching from one car to another.

These and other objects will become apparent to those skilled in the art from the following detailed description and drawings.

BRIEF DESCRIPTION OF DRAWINGS

FIG. 1 is a simplified perspective view of the windshield air deflector device of this invention, showing such device mounted on the upper dashboard of an automobile adjacent the windshield air vent.

FIG. 2 is a simplified sectional view of the device hereof, showing such device operably mounted to a dashboard, and further showing air from the windshield air vent being directed to the inside of an automotive windshield.

FIG. 3 is a sectional view, similar to FIG. 2, showing the device hereof in an inoperable mode.

DETAILED DESCRIPTION OF PREFERRED EMBODIMENT

The present invention is directed to an air deflector device that cooperates with an automobile's air defroster system. A conventional automobile, as known in the art, includes a dashboard face exhibiting various instruments for monitoring engine performance and speed, and a generally horizontal upper portion extending from the face to the windshield. Communicating with this upper portion are one or more defroster vents or ports appropriately positioned in close proximity to the windshield to generally direct defroster air near the windshield to help in freeing ice that may have accumulated on the exterior of the windshield. The air deflector device works with the defroster system to improve and speed up the defrosting process.

Turning now to the several Figures, where like reference numerals represent like components or features throughout the several views, FIG. 1 is a perspective view showing the construction of the device 10, and its relationship to the air defroster system of an automobile. The device 10 comprises an elongated, planar member 12, having a pair of legs 14 joined thereto by hinge 16. Without unduly limiting the design and construction of the device 10 hereof, a typical planar member may comprise a flexible plastic panel of about 4 by 12 inches. Additionally, the planar member, may be formed of a material that is transparent, tinted, translucent, or even opaque.

As best seen in FIGS. 2 and 3, showing respectively an operable mode and an inoperable mode, the legs 14 are secured adjacent the air defroster vent 18 by a permanent adhesive layer 20, if desired, or removably secured thereto by a double-sided tape, or a hook and pile type fabric fastener, as known in the art. This latter expedient allows the driver to selectively use the device in different automobiles.

FIG. 2 illustrates the operable mode of the device 10, where the planar member 12 has been pivoted upward and toward the windshield 22, and the defroster air is concentrated and directed against the windshield 22, note the air flow "arrows." During summer, or periods of nonuse, the planar member 12 is pivoted rearwardly, see FIG. 3, against the upper dashboard.

It is understood that variations, changes, and modifications may be made to the device of this invention. Accordingly, no limitation is intended to be imposed on the device hereof, except as set forth in the accompanying claims.

What is claimed is:

1. In combination with an automotive air defroster system, including an elongated port, on the upper dashboard in close proximity to the interior surface of the windshield, for transmitting heated air to the interior of the automobile, a windshield air deflector device for directing said heated air toward said windshield, said air deflector device comprising an elongated, heat resistant, planar member hingedly secured to at least a pair of legs, where said legs are removably secured to said upper dashboard by means selected from the group consisting of double sided adhesive tape and hook and pile type fabric fasteners, adjacent said port, whereby upward rotative movement of said planar member toward said windshield causes said heated air to be directed toward said windshield.

2. The combination of the air defroster system and air deflector device according to claim 1, where said planar member has light transmission qualities selected from the group consisting of transparent, tinted, translucent and opaque.

\* \* \* \* \*